United States Patent
Takatsura et al.

(10) Patent No.: US 7,597,375 B2
(45) Date of Patent: Oct. 6, 2009

(54) VEHICLE SEATS

(75) Inventors: Hiraku Takatsura, Aichi-ken (JP); Motohide Oyama, Nagoya (JP); Hisato Watanabe, Aichi-ken (JP); Koji Kawamoto, Toyota (JP); Tsutomu Abe, Numazu (JP); Jun Kanamori, Susono (JP)

(73) Assignee: Toyota Boshoku Kabushiki Kaisha, Aichi (JP)

( * ) Notice: Subject to any disclaimer, the term of this patent is extended or adjusted under 35 U.S.C. 154(b) by 170 days.

(21) Appl. No.: 11/625,148

(22) Filed: Jan. 19, 2007

(65) Prior Publication Data

US 2007/0187972 A1  Aug. 16, 2007

(30) Foreign Application Priority Data

Jan. 23, 2006 (JP) .............................. 2006-013683
Jan. 23, 2006 (JP) .............................. 2006-013693
Feb. 14, 2006 (JP) .............................. 2006-036230

(51) Int. Cl.
  *B60N 2/10* (2006.01)
(52) U.S. Cl. ............... 296/65.08; 296/65.09; 296/65.17
(58) Field of Classification Search ............. 296/65.01, 296/65.05, 65.08, 65.09, 65.16, 65.17, 65.18
See application file for complete search history.

(56) References Cited

U.S. PATENT DOCUMENTS

| | | | | | |
|---|---|---|---|---|---|
| 4,124,250 | A | * | 11/1978 | Weinich ..................... | 297/335 |
| 4,191,417 | A | * | 3/1980 | Ferrara .................... | 296/65.05 |
| 4,475,763 | A | * | 10/1984 | Hamatani et al. ........ | 296/65.09 |
| 4,512,609 | A | | 4/1985 | Pärsson | |
| 4,637,653 | A | * | 1/1987 | Yoshida et al. ............. | 297/334 |
| 5,044,683 | A | | 9/1991 | Pärsson | |
| 5,257,852 | A | * | 11/1993 | Tsuneki et al. ............. | 297/332 |
| 5,393,116 | A | * | 2/1995 | Bolsworth et al. ....... | 296/65.03 |
| 5,466,048 | A | | 11/1995 | Fowler et al. | |
| 5,641,202 | A | | 6/1997 | Rus | |
| 5,934,732 | A | * | 8/1999 | Jakubiec .................. | 296/65.01 |
| 5,941,591 | A | * | 8/1999 | Tsuge et al. ............. | 296/65.09 |
| 6,158,800 | A | * | 12/2000 | Tsuge et al. ............. | 296/65.09 |

(Continued)

FOREIGN PATENT DOCUMENTS

EP  1 197 380 A1  4/2002

(Continued)

*Primary Examiner*—Glenn Dayoan
*Assistant Examiner*—Paul A Chenevert
(74) *Attorney, Agent, or Firm*—Patterson, Thuente, Skaar & Christensen, P.A.

(57) ABSTRACT

A double folding mechanism of a seat of a vehicle can fold a seat cushion from a space on a floor and fold a seat back into the space, thereby changing the seat from its use condition to its retracted condition. The double folding mechanism can include a first connecting mechanism connecting the seat cushion and the floor and a second connecting mechanism connecting the seat back and the floor. The second connecting mechanism can control the rotational speed of the seat back such that the seat back can enter inside a rotational trajectory of a rear end of the seat cushion after the seat cushion comes out of a rotational trajectory of an upper end portion of the seat back. The double folding mechanism can change the seat from the use condition to the retracted condition in one operation.

12 Claims, 7 Drawing Sheets

U.S. PATENT DOCUMENTS

| | | |
|---|---|---|
| 6,455,948 B1 | 9/2002 | Berger |
| 6,817,646 B2 | 11/2004 | Kikuchi et al. |
| 6,910,739 B2 * | 6/2005 | Grable et al. .......... 297/378.12 |
| 6,974,174 B2 * | 12/2005 | Imajo et al. .............. 296/65.09 |
| 7,134,703 B2 * | 11/2006 | Jeong ...................... 296/65.03 |
| 7,293,838 B2 * | 11/2007 | Sugama et al. ........... 297/378.1 |
| 2005/0104384 A1 | 5/2005 | Kondo et al. |

FOREIGN PATENT DOCUMENTS

| | | |
|---|---|---|
| JP | 60244631 A * | 12/1985 |
| JP | 03189245 A2 | 8/1991 |
| JP | 2004 082902 | 8/2002 |
| JP | 2003-002098 | 1/2003 |
| JP | 2003-009979 | 1/2003 |

* cited by examiner

VEHICLE SEATS

This application claims priority to Japanese patent applications serial numbers 2006-013683, 2006-013693 and 2006-036230, the contents of which are incorporated herein by reference.

BACKGROUND OF THE INVENTION

The present invention relates to a seat of a vehicle. More particularly, the present invention relates to a seat of a vehicle having a double folding mechanism, i.e., a folding mechanism that can raise or fold a seat cushion forwardly and simultaneously fold a seat back forwardly, in order to retract the seat. Further, the present invention relates to the double folding mechanism.

Various types of seats (rear seats) of a vehicle having a double folding mechanism are already known. Such seats are taught, for example, by Japanese Laid-Open Patent Publication No. 2004-82902.

In a known seat having a double folding mechanism taught by Japanese Laid-Open Patent Publication No. 2004-82902, a seat cushion is pivotally connected to a floor via a hinge that is attached to a forward end thereof, so as to be rotated forwardly from a horizontal use position to a vertical or inverted retracted position about the hinge. Conversely, a seat back is rotatably connected to the floor via a pivot shaft that is attached to a lower end thereof, so as to be rotated forwardly from a vertical use position to a horizontal retracted position about the pivot shaft. In addition, the hinge of the seat cushion is linked with the pivot shaft of the seat back via a linking mechanism. Therefore, when the seat back is rotated between the use position and the retracted position, the seat cushion can also rotate synchronous with the motion of the seat back. The linking mechanism is arranged and constructed such that the seat back and the seat cushion can rotate without interfering with each other. Therefore, when the seat back rotates from the use position to the retracted position, the seat cushion can simultaneously rotate from the use position to the retracted position without interfering with the seat back, so that the seat is retracted. Thus, the vehicle may have an increased cargo space.

However, the linking mechanism described above has a special structure in order to avoid the interference between the seat cushion and the seat back. That is, the linking mechanism has a complicated structure. As a result, the structure of the seat is complicated. This may lead to an increased manufacturing cost of the seat.

Additional examples of relevant seats may be found in by Japanese Laid-Open Patent Publications Nos. 2003-2098 and 3-189245.

Thus, there is a need in the art for an improved seat.

BRIEF SUMMARY OF THE INVENTION

One embodiment according to the present invention includes a double folding mechanism of a seat of a vehicle, which mechanism can fold a seat cushion from a space on a floor and fold a seat back into the space, thereby changing the seat from its use condition to its retracted condition. The double folding mechanism may include a first connecting mechanism connecting the seat cushion and the floor, and a second connecting mechanism connecting the seat back and the floor. The first connecting mechanism includes a first rotational mechanism that supports the seat cushion on the floor so as to be rotatable in folding and unfolding directions, a first biasing device that biases the seat cushion supported by the first rotational mechanism in the folding direction, and a first retaining mechanism that retains the seat cushion biased by the first biasing device in its use position. The second connecting mechanism includes a second rotational mechanism that supports the seat back on the floor so as to be rotatable in folding and unfolding directions, a second biasing device that biases the seat back supported by the second rotational mechanism to the folding direction, a second retaining mechanism that retains the seat back biased by the second biasing device in its use position, and a biasing force control device that can control a rotational speed of the seat back rotating in the folding direction. The first and second retaining mechanisms are arranged and constructed to respectively be released in one operation. The biasing force control device of the second connecting mechanism is arranged and constructed to control the rotational speed of the seat back such that the seat back can enter inside a rotational trajectory of a rear end of the seat cushion after the seat cushion comes out of a rotational trajectory of an upper end portion of the seat back.

According to this double folding mechanism, the rotational speed of the seat back can be controlled or restricted by the biasing force control device. Therefore, the seat back can smoothly rotate without interfering the seat cushion. As a result, the seat can be smoothly retracted.

Other objects, features, and advantages, of the present invention will be readily understood after reading the following detailed description together with the accompanying drawings and the claims.

BRIEF DESCRIPTION OF THE SEVERAL VIEWS OF THE DRAWINGS(S)

DETAILED DESCRIPTION OF THE INVENTION

A representative example of the present invention has been described in detail with reference to the attached drawings. This detailed description is merely intended to teach a person of skill in the art further details for practicing preferred aspects of the present invention and is not intended to limit the scope of the invention. Only the claims define the scope of the claimed invention. Therefore, combinations of features and steps disclosed in the foregoing detailed description may not be necessary to practice the invention in the broadest sense, and are instead taught merely to particularly describe detailed representative examples of the invention. Moreover, the various features taught in this specification may be combined in ways that are not specifically enumerated in order to obtain additional useful embodiments of the present invention.

A detailed representative embodiment of the present invention is shown in FIG. 1 to FIG. 7.

Figure 1:
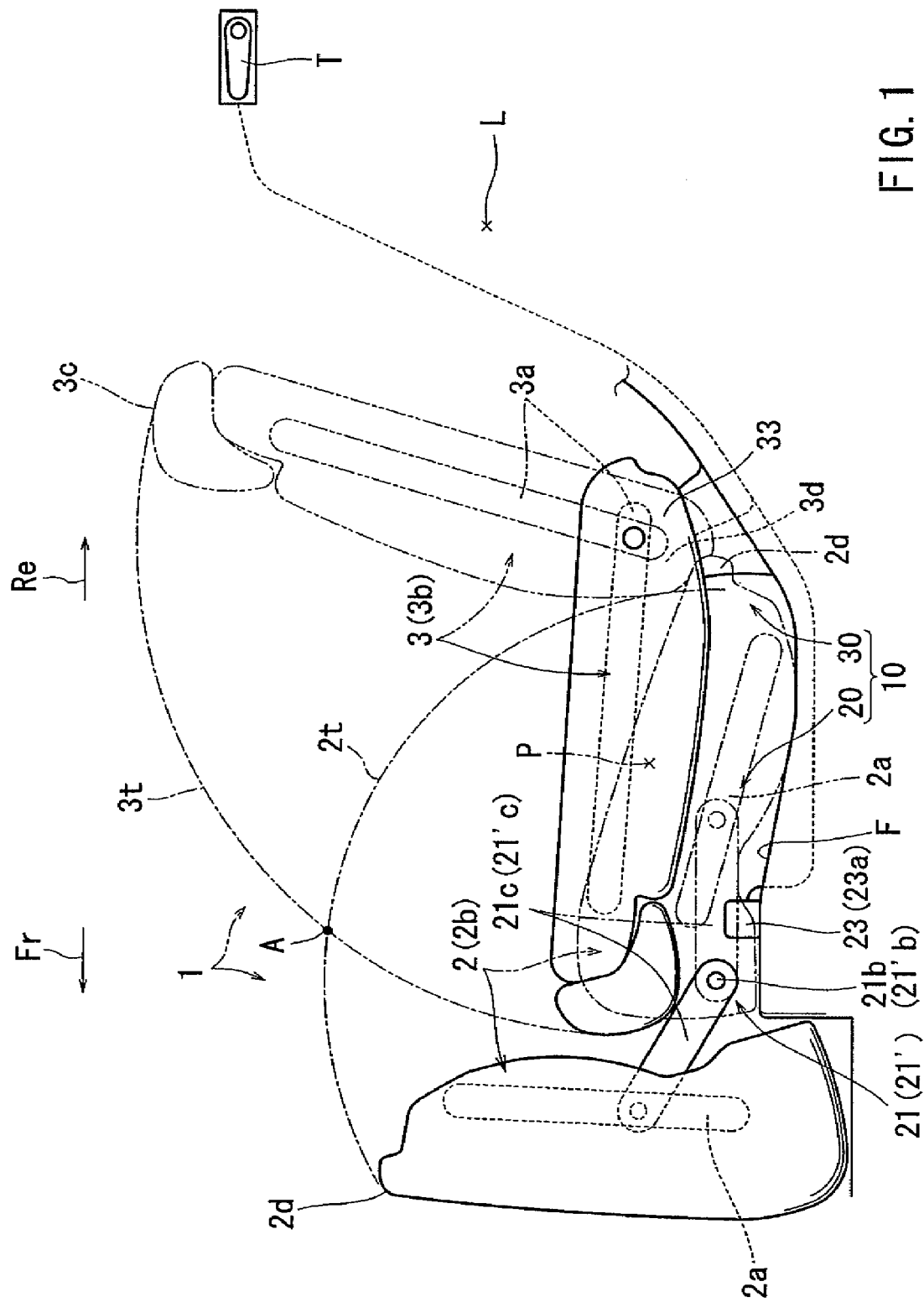
FIG. 1 is a side view of a seat of a vehicle according to one embodiment of the present invention, which illustrate a use condition and a retracted condition of the seat.
Figure 2:
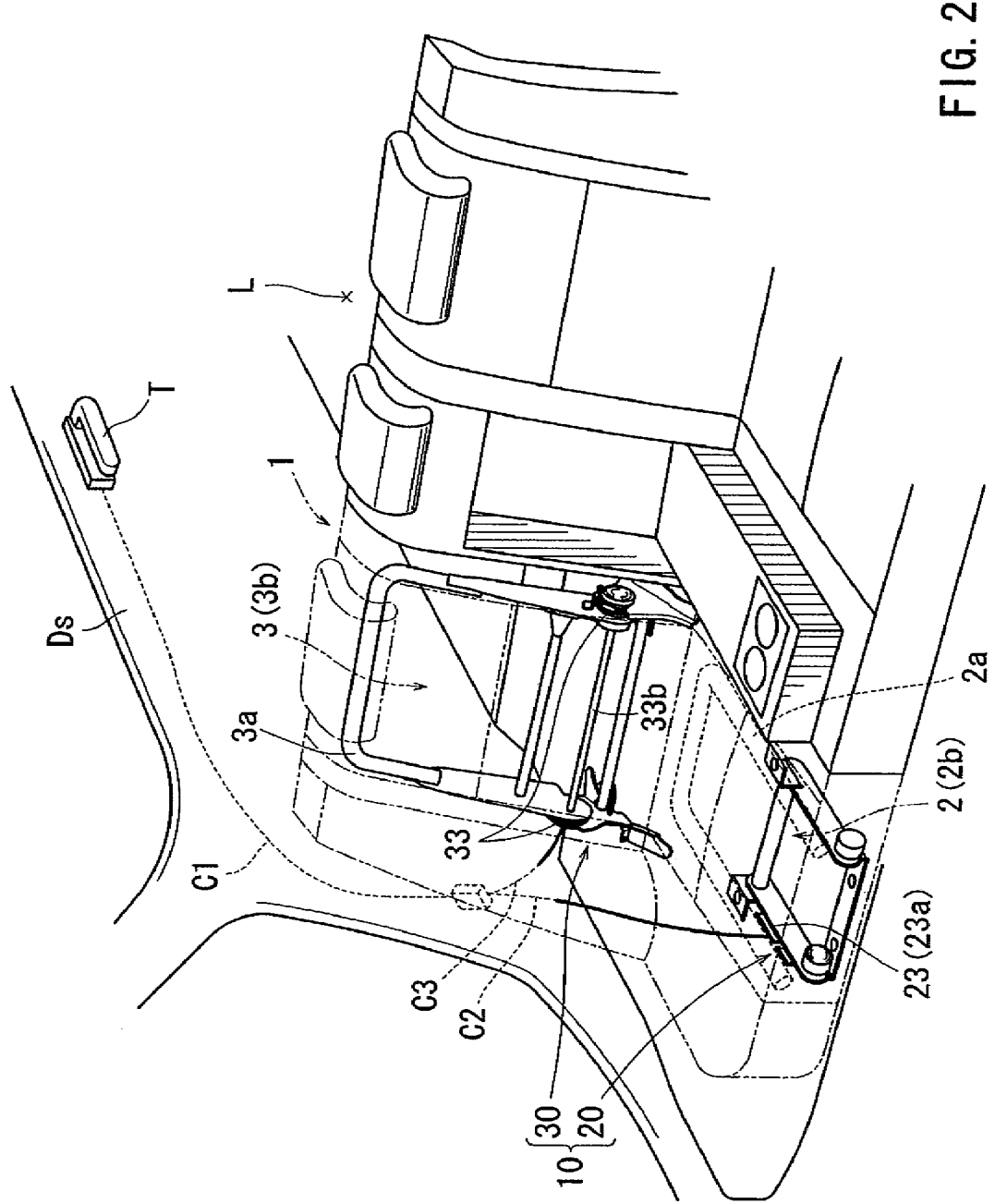
FIG. 2 is a perspective view of the seat, which schematically illustrates a double folding mechanism of the seat.
Figure 6:
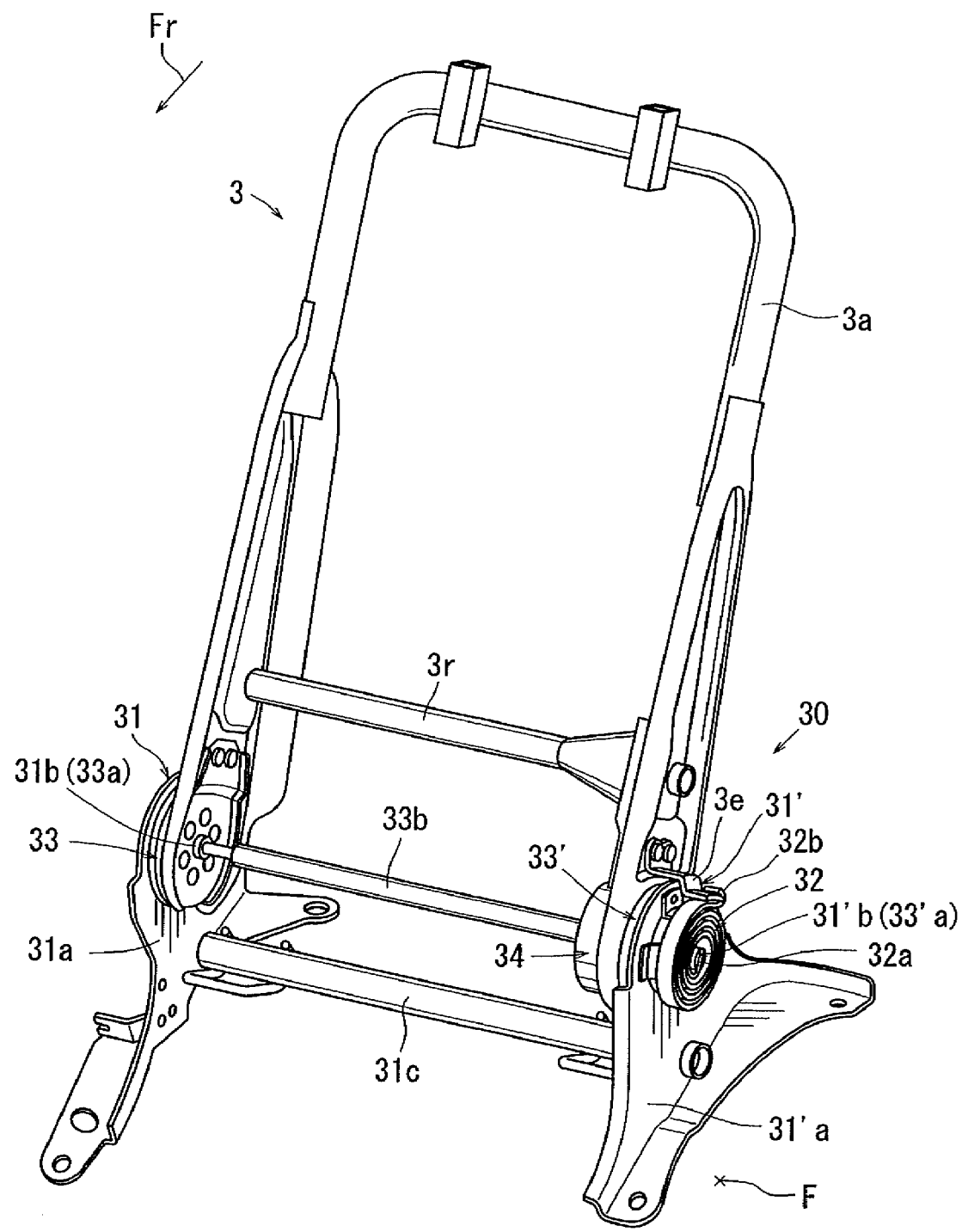
FIG. 6 is a perspective view of a second or seat back connecting mechanism that movably connects a back frame and the floor of the vehicle.

First, as shown in FIG. 2, in this embodiment, a retractable rear seat is exemplified as a seat 1 of a vehicle. As shown in, for example, FIG. 1, the seat 1 includes a seat cushion 2 and a seat back 3. The seat cushion 2 may preferably be constituted of a cushion frame 2a and a pad 2b attached to the cushion frame 2a. Similarly, the seat back 3 may preferably be constituted of a back frame 3a and a pad 3b attached to the back frame 3a. Further, the back frame 3a can be reinforced by a reinforcement member 3r (FIG. 6).

As shown in FIG. 1, the cushion frame 2a of the seat cushion 2 is rotatably connected to a floor F of the vehicle via a first or seat cushion connecting mechanism 20, so that the seat cushion 2 can be rotated forwardly from a horizontal use (unfolded) position shown by broken lines to a vertical or inverted retracted (folded) position shown by solid lines. Conversely, the back frame 3a of the seat back 3 is rotatably connected to the floor F of the vehicle via a second or seat back connecting mechanism 30, so that the seat back 3 can be rotated forwardly from a vertical use (unfolded) position shown by broken lines to a horizontal retracted (folded) position shown by solid lines. As will be appreciated, the seat cushion 2 can be positioned at a space P in its use position. Thus, the seat 1 can be changed from a use condition shown by broken lines to a retracted condition shown by solid lines. This allows a cargo space of the vehicle to be increased. As will be appreciated, in the use condition of the seat 1, the space P can be occupied with the seat cushion 2. On the contrary, in the retracted condition of the seat 1, the space P can be occupied with the seat back 3. Further, as shown by broken lines in FIG. 1, a rear end portion 2d of the seat cushion 2 is closely positioned under a lower end portion 3d of the seat back 3 when the seat 1 is in the use condition, so as to minimize a clearance between the seat cushion 2 and the seat back 3.

Further, the first and second connecting mechanisms 20 and 30 may constitute a double folding mechanism 10 of the present invention. The double folding mechanism 10 (the first and second connecting mechanisms 20 and 30) may preferably be connected to a manipulation lever T that is attached to a wall Ds of the vehicle via cables C1, C2 and C3, so as to be simultaneously operated.

Figure 5:
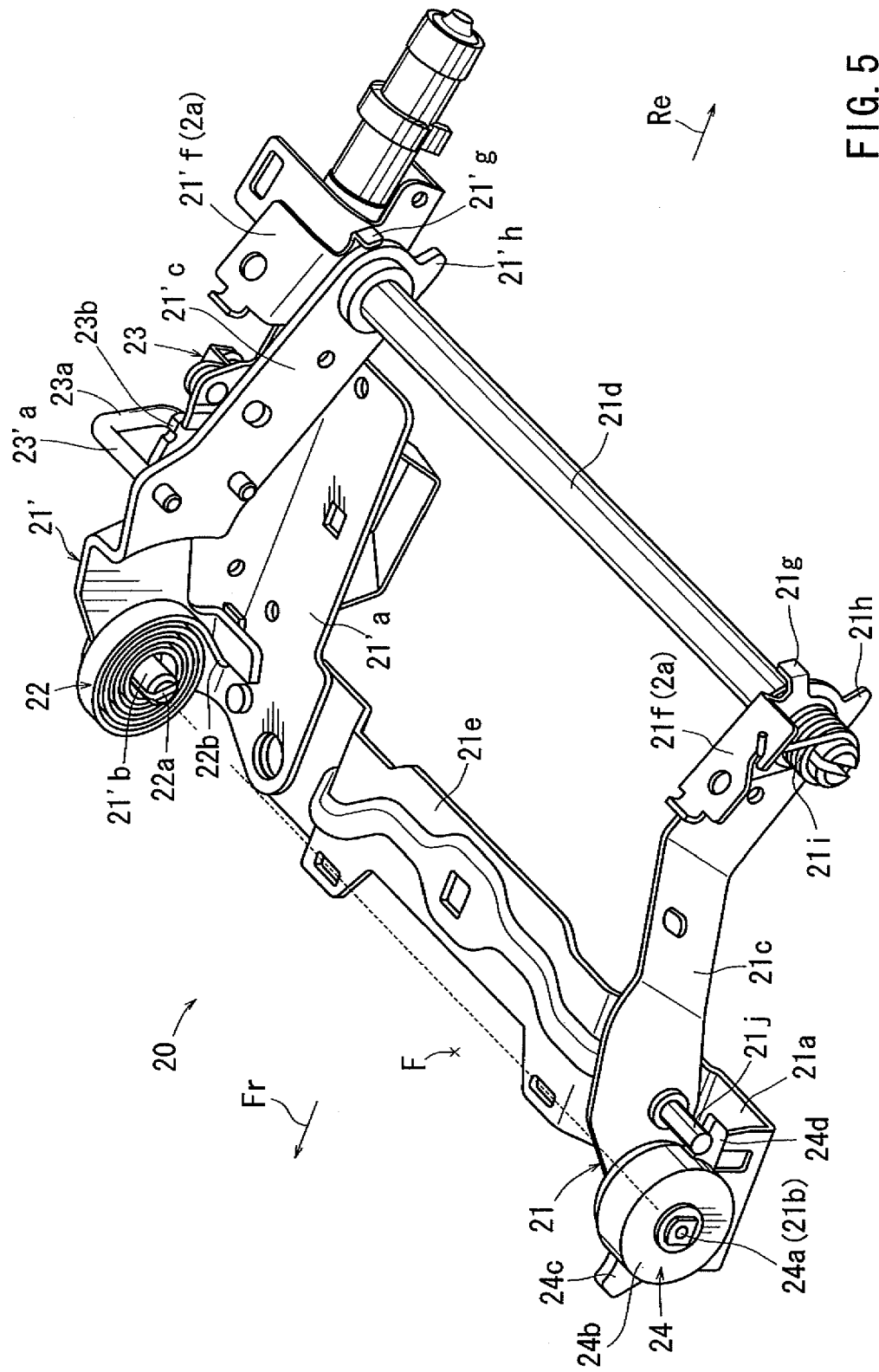
FIG. 5 is a perspective view of a first or seat cushion connecting mechanism that movably connects a cushion frame and a floor of the vehicle.

As shown in FIG. 5, the first connecting mechanism 20 (one of the double folding mechanism 10) includes a pair of first rotational mechanisms 21 and 21', a torsion spring 22 (a first biasing device), a locking mechanism 23 (a first retaining mechanism) and a viscous damper 24 (a biasing force control device).

Figure 3:
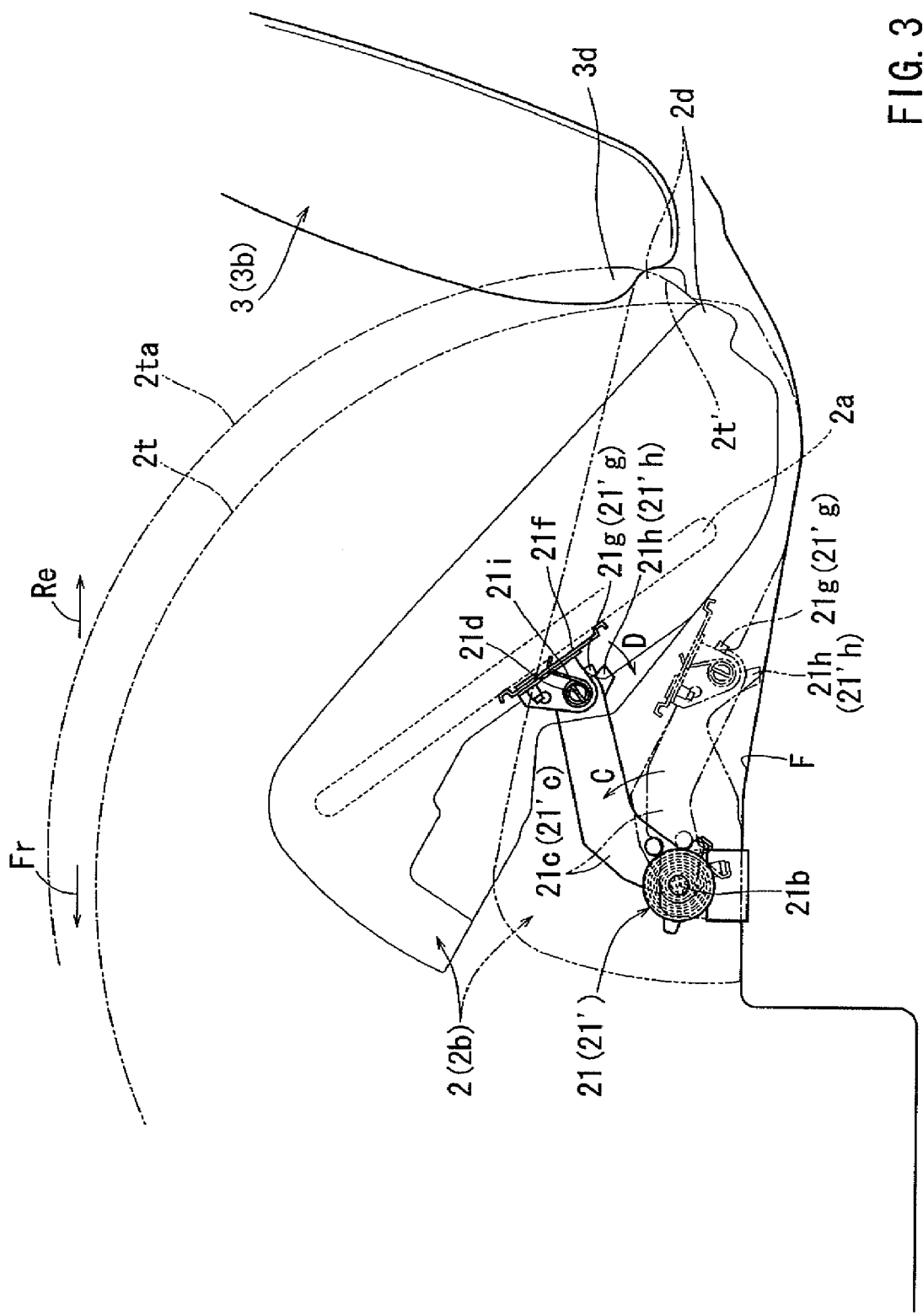
FIG. 3 is a side view of the seat, which illustrate a primary position of a seat cushion, i.e., a rotational position of the seat cushion immediately after the seat cushion starts to rotate forwardly from its use position toward its retracted position.
Figure 4:
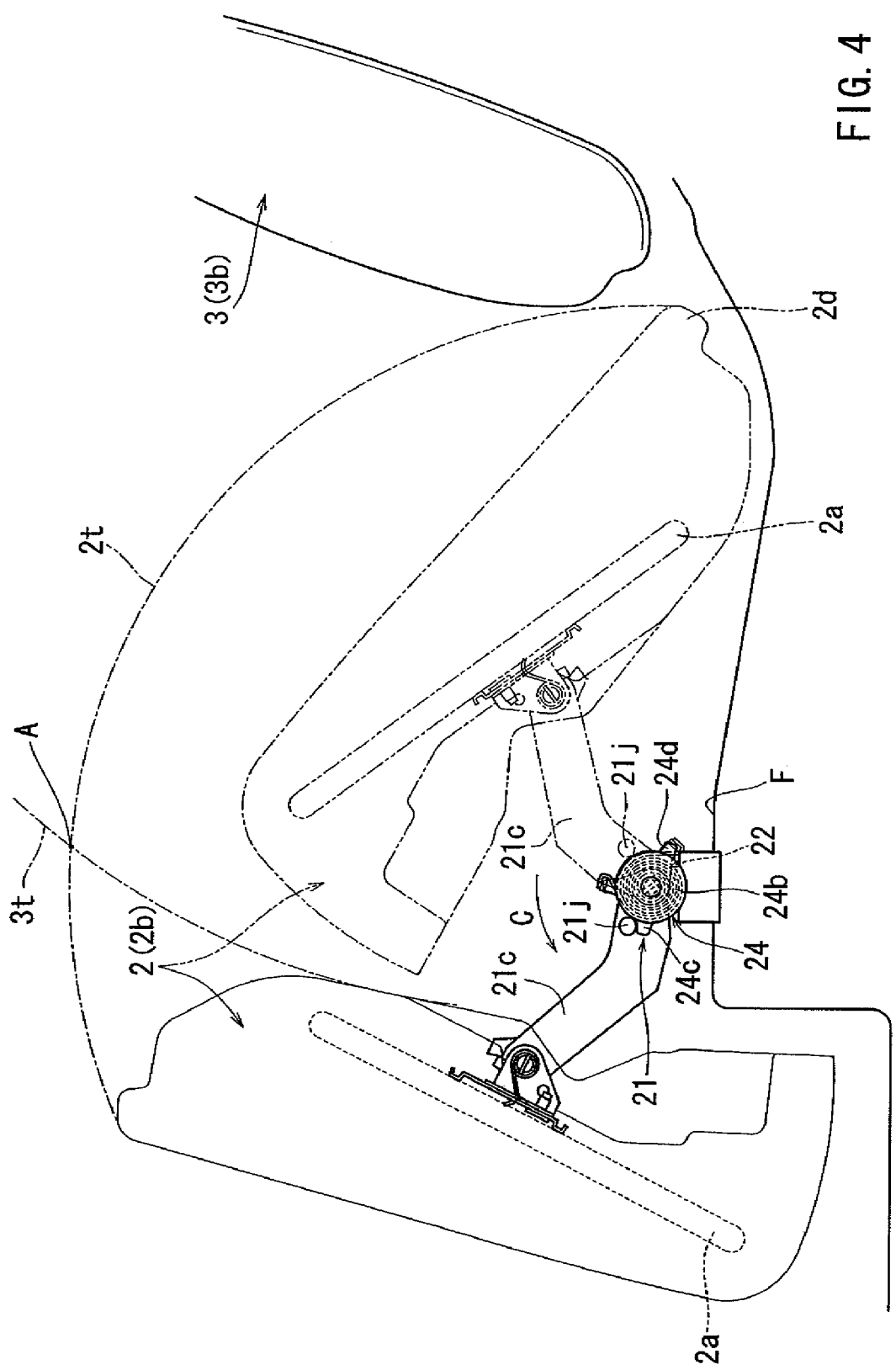
FIG. 4 is a side view of the seat, which illustrates an intermediate rotational position of the seat cushion, i.e., a rotational position of the seat cushion immediately after the seat cushion rotates until it is positioned outside a rotational trajectory of a seat back.

The first rotational mechanisms 21 and 21' are positioned so as to correspond to both sides of the seat cushion 2. The first rotational mechanism 21 includes a mounting bracket 21a and an elongated plate-shaped rotating member (lever) 21c. The mounting bracket 21a is fixedly connected to the floor F. The proximal end of the rotating member 21c is rotatably connected to the mounting bracket 21a via a pivot shaft 21b (a first rotational shaft) that is integrally connected to the mounting bracket 21a. Similarly, the first rotational mechanism 21' includes a mounting bracket 21'a and a rotating member (lever) 21'c. The mounting bracket 21'a is fixedly connected to the floor F. The proximal end of the rotating member 21'c is rotatably connected to the mounting bracket 21'a via a pivot shaft 21'b (the first rotational shaft) that is integrally connected to the mounting bracket 21'a. As will be apparent from the drawing, the mounting bracket 21a and the rotating member 21c respectively have a shape different from the mounting bracket 21'a and the rotating member 21'c. The mounting bracket 21a and 21'a are integrally connected to a reinforcement member 21e so as to be reinforced or rigidified. Further, the distal ends of the rotating members 21c and 21'c are interconnected via a connecting rod 21d (a second rotational shaft), so that the rotating members 21c and 21'c can rotate together. The connecting rod 21d may preferably be positioned parallel to the pivot shafts 21b and 21'b. Also, the rotating members 21c and 21'c may preferably include attachment brackets 21f and 21'f that respectively have engagement strips 21g and 21'g (a detent device). The attachment brackets 21f and 21'f are respectively integrally connected to the cushion frame 2a of the seat cushion 2 (FIG. 3). The attachment brackets 21f and 21'f are respectively attached to the distal ends of the rotating members 21c and 21'c so as to rotate around the connecting rod 21d. In addition, the distal ends of the rotating members 21c and 21'c are respectively provided with engagement projections 21h and 21'h (the detent device). The engagement projections 21h and 21'h are respectively arranged and constructed so as to contact the engagement strips 21g and 21'g of the attachment brackets 21f and 21'f when the attachment brackets 21f and 21'f are rotated rearwardly (i.e., in a direction Re) at an angle, thereby preventing the attachment brackets 21f and 21'f from rotating further. Further, a coil spring 21i (a second biasing device) is fixedly attached to the distal end of the rotating member 21c and engages the attachment bracket 21f. The coil spring 21i may preferably be disposed so as to surround the end portion of the connecting rod 21d. Thus, the attachment member 21f may preferably be biased rearwardly relative to the rotating member 21c by a spring force of the coil spring 21i.

The torsion spring 22 can include a spiral spring and positioned inside the proximal end of the rotating member 21'c. As will be apparent from the drawing, the torsion spring 22 may preferably be disposed so as to surround the pivot shaft 21'b. An inner or core end 22a (i.e., a support portion) of the torsion spring 22 is fixedly attached to the pivot shaft 21'b (the mounting bracket 21'a). Conversely, an outer end 22b (i.e., a biasing portion) of the torsion spring 22 engages the proximal end of rotating member 21'c. Thus, the rotating member 21'c may preferably be biased forwardly (i.e., in a direction Fr or a raising or folding direction of the seat cushion 2) relative to the mounting bracket 21'a by a spring force (a biasing force) of the torsion spring 22. As a result, the rotating member 21c may also be biased forwardly relative to the mounting bracket 21a because the rotating member 21c is connected to the rotating member 21'c via the connecting rod 21d.

The locking mechanism 23 is positioned adjacent to the rotating member 21'c and is fixedly attached to the mounting bracket 21'a (the floor F). The locking mechanism 23 may preferably have an engagement member 23b such as a hook. The engagement member 23b of the locking mechanism 23 is arranged and constructed to engage a striker 23a provided on the rotating member 21'c when the rotating member 21'c is in a position (i.e., a normal position) shown by broken lines in FIG. 1 (i.e., when the seat cushion 2 is in a horizontal use position so that the lower surface of the seat cushion 2 contacts the floor F). As will be recognized, when the engagement member of the locking mechanism 23 engages the striker 23a of the rotating member 21'c, the rotating member 21'c (and 21c) is locked and is maintained in a locking position, so as to be prevented from rotating relative to the floor F. Thus, the first rotational mechanism 21 can be locked by the locking mechanism 23 and can be maintained in a locking condition, so that the seat cushion 2 can be maintained in the horizontal use position. In addition, as shown in FIG. 2, the locking mechanism 23 may preferably be connected to the manipulation lever T via the cables C1 and C2, so that the engagement member 23b of the locking mechanism 23 can be disengaged from the striker 23a by manipulating the manipulation lever T. Therefore, the locking mechanism 23 can be unlocked by manipulating the manipulation lever T, so that the rotating member 21'c can be released.

As shown in FIG. 5, the striker 23a may preferably is a rotated U-shaped member having a pair of leg portions 23'a (one of which is shown). The striker 23a is designed so as not to project laterally from the rotating member 21'c. In addition, the striker 23a may preferably be arranged so that the leg portions 23'a are vertically aligned with each other when the rotating member 21'c is in the normal position (i.e., the locking position), which position corresponds to the use position of the seat cushion 2. In other words, the striker 23a may preferably be arranged so that the leg portions 23'a are respectively positioned along rotation directions of the rotating member 21'c. Also, the engagement member 23b of the locking mechanism 23 is arranged and constructed to engage the lower leg portion 23'a of the striker 23a. Therefore, the locking mechanism 23 can reliably withstand a large force applied between the rotating member 21'c and the locking mechanism 23.

The viscous damper 24 has a cylindrical shape and is positioned outside the proximal end of the rotating member 21c. The viscous damper 24 has a central bearing portion 24a, and a rotor portion 24b that is connected to the bearing portion 24a so as to be rotatable therearound. The bearing portion 24a may preferably be journaled on and fixedly attached to the pivot shaft 21b that is fixedly connected to the mounting bracket 21a. The viscous damper 24 may preferably be filled with a viscous fluid (e.g., a silicone oil). The viscous fluid can frictionally flow in the viscous damper 24 when the rotor portion 24b is rotated, thereby producing a viscous drag or friction therein.

The rotor portion 24b may preferably have a pair of engagement strips 24c and 24d that are circumferentially oppositely positioned thereon. The engagement strip 24c is arranged and constructed to engage an engagement pin 21j provided on the rotating member 21c when the rotating member 21e rotates forwardly (counterclockwise shown by an arrow C in FIG. 4) from the normal position shown by broken lines in FIG. 1 toward a retracted rotational position shown by solid lines in FIG. 1 and reaches an intermediate rotational position shown by solid lines in FIG. 4 (i.e., when the seat cushion 2 rotates until it is positioned at an intermediate position that is outside a rotational trajectory 3t of a upper end portion 3c of the seat back 3). Upon engagement of the engagement strip 24c and the engagement pin 21j, a rotational force of the rotating member 21c can be applied to the rotor portion 24b, thereby rotating the rotor portion 24b forwardly (counterclockwise shown by an arrow C in FIG. 4). Therefore, when the rotating member 21c further rotates forwardly thereafter, the viscous drag is produced within the viscous damper 24 so as to dampen the rotational force of the rotating member 21c. As a result, a rotational speed of the rotating member 21c can be reduced. Thus, the rotating member 21c can rotate slowly from the intermediate rotational position shown by solid lines in FIG. 4 to the retracted rotational position shown by solid lines in FIG. 1. Conversely, the engagement strip 24d is arranged and constructed to engage an engagement pin 21j when the rotating member 21c rotates rearwardly (clockwise in FIG. 4) from the retracted position shown by solid lines in FIG. 1 toward the normal position shown by broken lines in FIG. 1, so that the rotor portion 24b can rotate rearwardly with the rotating member 21c.

In addition, the viscous damper 24 may preferably have a flow control mechanism (not shown) that can control a flow rate of the viscous fluid contained therein. The flow control mechanism may preferably be arranged and constructed such that the flow rate of the viscous fluid can be controlled or changed depending on rotational directions (i.e., the forward direction or the rearward direction) of the rotor portion 24b. That is, the flow control mechanism may preferably be arranged and constructed such that the viscous drag produced in the viscous damper 24 can be changed depending on the rotational directions of the rotor portion 24b. In this embodiment, the flow control mechanism is arranged and constructed such that the viscous drag can substantially be produced only when the rotor portion 24b rotates forwardly or counterclockwise shown by the arrow C in FIG. 4. Therefore, the rotational speed of the rotating member 21c can substantially be reduced or dampened only when the rotating member 21c rotates from the intermediate rotational position shown by solid lines in FIG. 4 to the retracted rotational position shown by solid lines in FIG. 1. In other words, the rotational speed of the rotating member 21c cannot be reduced or dampened when the rotating member 21c rotates rearwardly (clockwise in FIG. 4) from the retracted rotational position shown by solid lines in FIG. 1 toward the normal position shown by broken lines in FIG. 1.

As described above, the rotating members 21c and 21'c are biased forwardly (i.e., counterclockwise shown by an arrow C in FIG. 3) relative to the mounting brackets 21a and 21'a by the spring force of the torsion spring 22. Further, the attachment brackets 21f and 21'f are respectively integrally connected to the cushion frame 2a of the seat cushion 2 (FIG. 3). The attachment brackets 21f and 21'f are respectively pivotally attached to the distal ends of the rotating members 21c and 21'c. In addition, the attachment member 21f is biased rearwardly (i.e., clockwise shown by an arrow D in FIG. 3) by the spring force of the coil spring 21i. Therefore, when the rotating members 21c and 21'c rotate forwardly about the pivot shafts 21b and 21'b by the spring force of the torsion spring 22, the attachment member 21f (21'f) rotates rearwardly about the connecting rod 21d by the spring force of the coil spring 21i, so that the cushion frame 2a can be inclined or rotated rearwardly. That is, the rotating members 21c and 21'c rotate forwardly while the cushion frame 2a is inclined rearwardly. Thus, the seat cushion 2 can rotate forwardly about the pivot shafts 21b and 21'b while inclining rearwardly about the connecting rod 21d (i.e., while the rear end portion 2d thereof rotate downwardly). As shown by solid lines in FIG. 3, the cushion frame 2a is inclined or rotated rearwardly until the engagement strips 21g and 21'g of the attachment brackets 21f and 21'f respectively contact the engagement projections 21h and 21'h of the rotating members 21c and 21'c. At this time, the rear end portion 2d of the seat cushion 2 may preferably move along a trajectory 2t'. As will be easily understood, the trajectory 2t' may correspond to a composite trajectory of a trajectory of the rear end portion 2d due to the rotational motion of the rotating members 21c and 21'c and an additional trajectory of the rear end portion 2d due to the rotational motion of the attachment brackets 21f and 21'f. Further, a position of the seat cushion 2 shown by solid lines in FIG. 3 will be referred to as a primary position. Upon rearward rotation of the cushion frame 2a, the rear end portion 2d of the seat cushion 2 moves downwardly so as to be spaced apart form the lower end portion 3d of the seat back 3. Further, the coil spring 21i and the torsion spring 22 are respectively designed such that the spring force of the coil spring 21*i* is greater than the spring force of the torsion spring 22. Therefore, when the seat cushion 2 starts to rotate forwardly, the seat cushion 2 can quickly incline rearwardly (i.e. the rear end portion 2*d* of the seat cushion 2 can move downwardly).

When the rotating members 21*c* and 21'*c* further rotate forwardly by the spring force of the torsion spring 22 after the engagement strips 21*g* and 21'*g* respectively contact the engagement projections 21*h* and 21'*h*, the attachment member 21*f* (21'*f*) rotates forwardly together with the rotating members 21*c* and 21'*c* without rotating around the connecting rod 21*d*, so that the seat cushion 2 can be rotated forwardly from the primary position shown by solid lines in FIG. 3 toward the retracted position shown by solid lines in FIG. 1. At this time, as shown in FIG. 3, the seat cushion 2 can effectively be prevented from interfering with the seat back 3 because the rear end portion 2*d* of the seat cushion 2 moves along a circular arc rotational trajectory 2*t* centered on the pivot shafts 21*b* and 21'*b*, which trajectory has a radius smaller than the radius of a trajectory 2*ta* centered on the pivot shafts 21*b* and 21'*b*. The trajectory 2*ta* corresponds to a hypothetical trajectory along which the rear end portion 2*d* of the seat cushion will move if the attachment members 21*f* and 21'*f* are not provided (i.e., if the rear end portion 2*d* of the seat cushion 2 does not move or tilt downwardly when the seat cushion 2 moves from the use position to the primary position). As will be recognized, if the rear end portion 2*d* of the seat cushion 2 moves along the hypothetical trajectory 2*ta*, the seat cushion 2 will interfere with the seat back 3 so as to be prevented from smoothly rotating forwardly.

As shown in FIG. 6, the second connecting mechanism 30 (one of the double folding mechanism 10) includes a pair of second rotational mechanisms 31 and 31', a torsion spring 32 (a second biasing device), a pair of reclining mechanisms 33 and 33' (a second retaining mechanism) and a viscous damper 34 (a biasing force control device).

The second rotational mechanisms 31 and 31' are positioned so as to correspond to both sides of the seat back 3. The second rotational mechanism 31 includes a mounting bracket 31*a* and a rotating shaft 31*b*. The mounting bracket 31*a* is fixedly connected to the floor F. The rotating shaft 31*b* rotatably connects the lower end of the back frame 3*a* of the seat back 3 to the mounting bracket 31*a*. Similarly, the second rotational mechanism 31' includes a mounting bracket 31'*a* and a pivot shaft 31'*b*. The mounting bracket 31'*a* is fixedly connected to the floor F. The pivot shaft 31'*b* rotatably connects the lower end of the back frame 3*a* of the seat back 3 to the mounting bracket 31'*a*. Further, the mounting brackets 31*a* and 31'*a* are interconnected to each other via a reinforcement rod 31*c*.

The torsion spring 32 is constituted of a spiral spring and is positioned outside the upper end of mounting bracket 31'*a*. As will be apparent from the drawing, the torsion spring 32 may preferably be disposed so as to surround the pivot shaft 31'*b*. An inner or core end 32*a* (i.e., a support portion) of the torsion spring 32 is fixedly attached to the pivot shaft 31'*b* (the mounting bracket 31'*a*). Conversely, an outer end 32*b* (i.e., a biasing portion) of the torsion spring 32 engages the lower end of back frame 3*a* via an engagement strip 3*e* that is attached thereto. Thus, the back frame 3*a* may preferably be biased forwardly (i.e., in the direction Fr or a folding direction of the seat back 3) relative to the mounting bracket 31'*a* by a spring force (a biasing force) of the torsion spring 32.

The reclining mechanism 33 is positioned between the lower end of the back frame 3*a* and the mounting bracket 31*a*. The reclining mechanism 33 includes a pair of opposing disk-like housings, i.e., a first and second housings, that are arranged and constructed to rotate relative to each other around a rotational shaft 33*a* that is connected to the pivot shaft 31*b*. The first and second housings are respectively affixed to the lower end of the back frame 3*a* and the mounting bracket 31*a* by an appropriate bonding means such as welding. Therefore, the back frame 3*a* and the mounting bracket 31*a* can rotate relative to each other around the rotational shaft 33*a*. The reclining mechanism 33 may preferably include a locking mechanism (not shown) that can controllably lock the reclining mechanism 33 and maintain the same in a locking condition, so that the seat back 3 can be maintained in the vertical use position. The locking mechanism may preferably be connected to the manipulation lever T via the cables C1 and C3, so that the locking mechanism can be released by manipulating the manipulation lever T. Further, the locking mechanism of the reclining mechanism 33 is arranged and constructed so as to be unlocked substantially simultaneously with the first rotational mechanism 21' of the first connecting mechanism 20.

The reclining mechanism 33' is positioned between the lower end of the back frame 3*a* and the mounting bracket 31'*a*. The reclining mechanism 33' may preferably have the same construction as the reclining mechanism 33. Therefore, detailed description of the reclining mechanism 33' will be omitted. As shown in FIG. 6, the reclining mechanisms 33 and 33' thus constructed are interconnected via a connecting shaft 33*b* so as to be synchronously operated.

Figure 7:
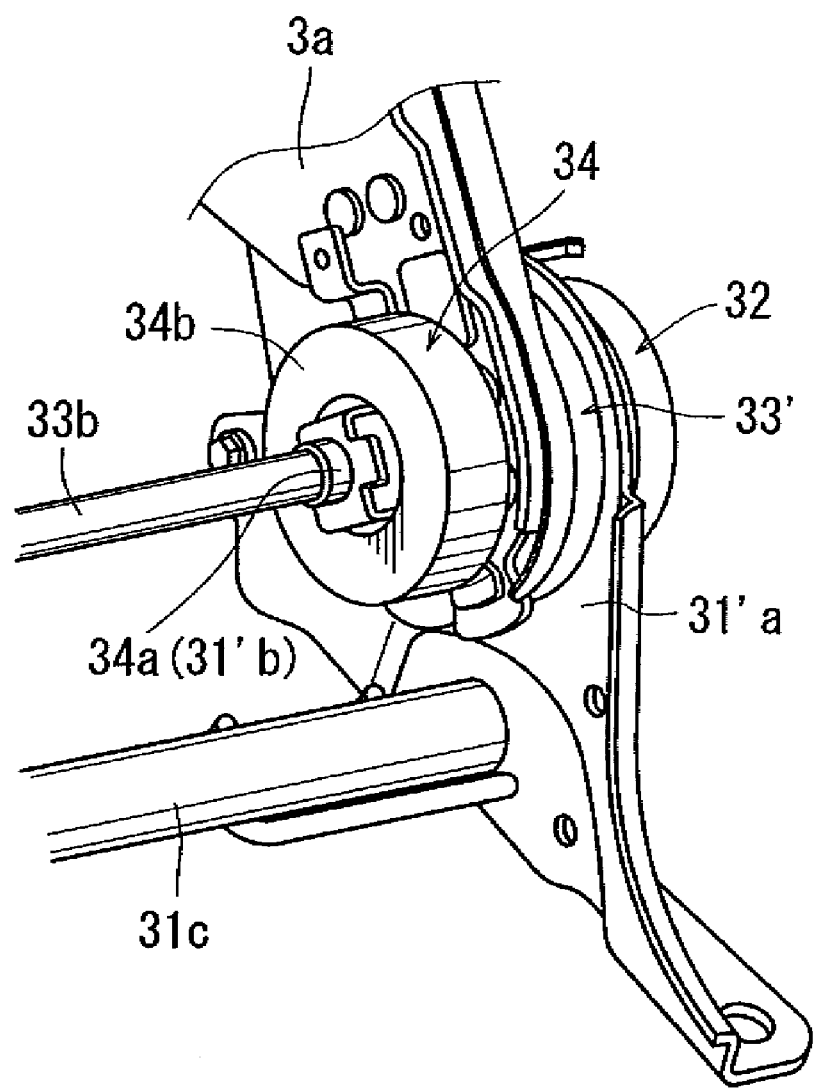
FIG. 7 is an enlarged perspective view of a viscous damper that can be used in the second connecting mechanism.

As shown in FIGS. 6 and 7, the viscous damper 34 has a cylindrical shape and is positioned inside the lower end of the back frame 3*a* so as to be adjacent to the reclining mechanism 33' with interleaving the lower end of the back frame 3*a* therebetween. The viscous damper 34 has a central bearing portion 34*a*, and a rotor portion 34*b* that is connected to the bearing portion 34*a* so as to be rotatable therearound. The bearing portion 34*a* may preferably be journaled on and fixedly attached to the pivot shaft 31'*b* (the rotational shaft 33'*a* and the connecting shaft 33*b*). The rotor portion 34*b* is fixedly attached to the back frame 3*a* so as to rotate with the back frame 3*a*. Similar to the viscous damper 24, the viscous damper 34 may preferably be filled with a viscous fluid (e.g., a silicone oil). The viscous fluid can frictionally flow in the viscous damper 34 when the rotor portion 34*b* is rotated, thereby producing a viscous drag or friction therein.

In addition, the viscous damper 34 may preferably have a flow control mechanism (not shown) that can control a flow rate of the viscous fluid contained therein. The flow control mechanism may preferably be arranged and constructed such that the flow rate of the viscous fluid can be controlled or changed depending on rotational directions (i.e., the forward direction or the rearward direction) of the rotor portion 34*b*. That is, the flow control mechanism may preferably be arranged and constructed such that the viscous drag produced in the viscous damper 34 can be changed depending on the rotational directions of the rotor portion 34*b*. In this embodiment, the flow control mechanism is arranged and constructed such that the viscous drag can substantially be produced only when the rotor portion 34*b* rotates forwardly (i.e., when the back frame 3*a* (the seat back 3) is rotated from the vertical use position shown by broken lines in FIG. 1 to the horizontal retracted position shown by solid lines in FIG. 1). In other words, the rotational speed of the back frame 3*a* cannot be reduced or dampened when the back frame 3*a* rotates rearwardly from the retracted position shown by solid lines in FIG. 1 toward the use position shown by broken lines in FIG. 1. Also, unlike the viscous damper 24, the viscous damper 34 is designed such that the rotational speed of the back frame 3a can always be reduced or dampened when the back frame 3a rotates forwardly.

In addition, the viscous damper 34 may preferably be designed so as to produce a desired viscous drag that can appropriately control or reduce the forward rotational speed of the seat back 3, so that when the seat cushion 2 and the seat back 3 are rotated forwardly, the seat back 3 does not enter inside the rotational trajectory 2t of the rear end portion 2d of the seat cushion 2 before the seat cushion 2 completely moves outside the rotational trajectory 3t of the upper end portion 3c of the seat back 3. In other words, the viscous damper 34 may preferably be designed so as to appropriately control or reduce the forward rotational speed of the seat back 3, so that when the seat cushion 2 and the seat back 3 are rotated forwardly, the upper end portion 3c of the seat back 3 can pass through an intersection A of the rotational trajectory 2t of the rear end portion 2d of the seat cushion 2 and the rotational trajectory 3t of the upper end portion 3c of the seat back 3 only after the rear end portion 2d of the seat cushion 2 passes through the intersection A.

Next, operations of the seat 1 having a double folding mechanism 10 thus constructed will now be described in detail. Further, described herein is a process for changing the seat 1 from the use condition shown by broken lines in FIG. 1 to the retracted condition shown by solid lines in FIG. 1.

First, in order to change the seat 1 from the use condition shown by broken lines in FIG. 1 to the retracted condition shown by solid lines in FIG. 1, the manipulation lever T is operated so as to pull the cable C1. As a result, the cable C2 is pulled, thereby unlocking the locking mechanism 23 of the first connecting mechanism 20, so that the first rotational mechanisms 21' (and 21) can be released. Upon releasing of the first rotational mechanisms 21 and 21', the rotating members 21c and 21'c starts to rotate forwardly by the spring force of the torsion spring 22, so that the seat cushion 2 starts to rotate forwardly from the horizontal use position toward the vertical retracted position. Simultaneously, the cable C3 is also pulled, thereby unlocking the locking mechanism of the reclining mechanisms 33 and 33' of the second connecting mechanism 30, so that the reclining mechanisms 33 and 33' can also be released. Upon releasing of the reclining mechanisms 33 and 33', the back frame 3a starts to rotate forwardly by the spring force of the torsion spring 32, so that the seat back 3 starts to rotate forwardly from the vertical use position toward the horizontal retracted position.

As shown in FIG. 3, when the rotating members 21c and 21'c are rotated forwardly around the pivot shafts 21b and 21'b, the seat cushion 2 rotates forwardly while inclining rearwardly around the connecting rod 21d due to the attachment brackets 21f and 21'f (i.e., while the rear end 2d of the seat cushion 2 is moved downwardly) until the seat cushion 2 reaches the primary position shown by solid lines in FIG. 3. At this time, as described above, the rear end portion 2d of the seat cushion 2 may preferably move along the trajectory 2t'. When the rotating members 21c and 21'c are further rotated forwardly, the seat cushion 2 is rotated forwardly without inclining rearwardly from the primary position toward the retracted position shown by solid lines in FIG. 1. At this time, as described above, the rear end portion 2d of the seat cushion 2 may preferably move along the trajectory 2t. Further, when the seat cushion 2 reaches the intermediate rotational position shown by solid lines in FIG. 4, the engagement pin 21j of the rotating member 21c contacts and urges the engagement strip 24c of the viscous damper 24, so that the viscous drag is produced in the viscous damper 24, thereby dampening the rotational force of the rotating member 21c. As a result, a rotational speed of the rotating member 21c can be reduced, so that the seat cushion 2 can rotate slowly from the intermediate rotational position to the retracted position. Thus, the seat cushion 2 can be appropriately retracted.

Conversely, when the back frame 3a is rotated forwardly, the seat back 3 rotates forwardly from the vertical use position shown by broken lines in FIG. 1 toward the horizontal retracted position shown by solid lines in FIG. 1. As described above, because the viscous damper 34 is designed such that the rotational speed of the back frame 3a can always be reduced, the seat back 3 can slowly rotate at substantially a constant rotational speed from the vertical use position to the horizontal retracted position. Thus, the seat back 3 can be retracted.

As described above, when the seat cushion 2 rotates from the use position to the primary position shown by solid lines in FIG. 3, the rear end portion 2d thereof can move along the trajectory 2t'. Therefore, the seat cushion 2 can rotate from the use position to the primary position without interfering with the lower end 3d of the seat back 3. Further, when the seat cushion 2 rotates from the primary position to the retracted position shown by solid lines in FIG. 1, the rear end portion 2d thereof can move along the trajectory 2t. In addition, as previously described, the forward rotational speed of the back frame 3a is appropriately controlled by the viscous damper 34 such that the seat back 3 can enter inside the rotational trajectory 2t of the rear end 2d of the seat cushion 2 after the seat cushion 2 comes out of the rotational trajectory 3t of the upper end portion 3c of the seat back 3. Therefore, the seat cushion 2 can rotate from the primary position to the retracted position without interfering with the seat back 3. Further, the seat cushion 2 can rotate from the primary position to the intermediate position at a first rotational speed. Also, the seat cushion 2 can rotate from the intermediate position to the retracted position at a second rotational speed that is slower than the first rotational speed.

Thus, the seat cushion 2 can rotate forwardly at the controlled two different rotational speeds (i.e., the first and second rotational speeds). At this time, the rear end 2d thereof moves along the special trajectories 2t' and 2t. Conversely, the seat back 3 can rotate at the constant rotational speed. In addition, the forward rotational speed of the back frame 3a is appropriately controlled such that the seat back 3 can enter inside the rotational trajectory 2t after the seat cushion 2 comes out of the rotational trajectory 3t. Therefore, the seat cushion 2 and the seat back 3 can respectively be retracted without interfering with each other.

According to the double folding mechanism 10, the locking mechanism 23 of the first connecting mechanism 20 and the locking mechanism of the reclining mechanism 33 of the second connecting mechanism 30 can be unlocked by operating the manipulation lever T. Therefore, the present seat 1 can be easily retracted in one operation, i.e., by simply operating the manipulation lever T.

The double folding mechanism 10 can be constructed from mechanical components only That is, in the double folding mechanism 10, no electric components are required. Therefore, the structure of the double folding mechanism 10 can be simplified.

Each of the viscous dampers 24 and 34 can be a rotary type damper, which also can be miniaturized. Therefore, the double folding mechanism 10 can be effectively prevented from increasing in size.

The seat cushion 2 can rotate slowly between the intermediate position and the retracted position due to the dampening function of the viscous damper 24. Therefore, the seat cushion 2 can be gently or safely retracted.

The seat cushion 2 can rotate quickly between the use position and the intermediate position due to the spring force of the torsion spring 22. Therefore, it is possible to minimize the time that is required to complete retracting operation of the seat 1.

Naturally, various changes and modifications may be made to the present invention without departing from the scope of the invention. For example, in the above described embodiment, the viscous damper 24 is arranged and constructed to function when the seat cushion 2 reaches the intermediate position. However, the viscous damper 24 can be arranged and constructed to function before or after the seat cushion 2 reaches the intermediate position.

In the embodiment, as described above, the seat cushion 2 can be rotated forwardly. However, the seat 1 can be a different type of seat in which the seat cushion 2 can be rotated laterally.

In the embodiment, as described above, the seat 1 can be designed such that the seat cushion 2 can be inverted in its retracted position. However, the seat 1 can be designed such that the seat cushion 2 can be reversed in its retracted position.

Further the viscous dampers 24 and 34 can be replaced with various types of dampers, for example, spring members, gas springs and friction devices. Also, the number of the dampers 24 and 34 can be changed in compliance with design requirements.

Further, the torsion springs 22 and 32 can be replaced with various types of springs, for example, extension springs.

What is claimed is:

1. A double folding mechanism of a seat of a vehicle, which mechanism can fold a seat cushion from a space on a floor and fold a seat back into the space, thereby changing the seat from a use condition to a retracted condition, comprising:

a first connecting mechanism connecting the seat cushion and the floor, the first connecting mechanism comprises a first rotational mechanism that supports the seat cushion on the floor so as to be rotatable in a folding and unfolding direction, a first biasing device that biases the seat cushion supported by the first rotational mechanism in the folding direction, and a first retaining mechanism that retains the seat cushion biased by the first biasing device in a use position, and a second connecting mechanism connecting the seat back and the floor, the second connecting mechanism comprises a second rotational mechanism that supports the seat back on the floor so as to be rotatable in a folding and unfolding direction, a second biasing device that biases the seat back supported by the second rotational mechanism in the folding direction, a second retaining mechanism that retains the seat back biased by the second biasing device in a use position, and a biasing force control device capable of controlling a rotational speed of the seat back rotating in the folding direction, wherein the first and second retaining mechanisms are arranged and constructed to be released in one operation, wherein the biasing force control device of the second connecting mechanism is arranged and constructed to control the rotational speed of the seat back such that the seat back can enter inside a rotational trajectory of a rear end portion of the seat cushion after the seat cushion comes out of a rotational trajectory of an upper end portion of the seat back, wherein the first rotational mechanism comprises a rotating member that is rotatably connected to the floor via a first rotational shaft and is rotatably connected to the seat cushion via a second rotational shaft that is positioned parallel to the first rotational shaft, and a detent device that is positioned between the rotational member and the seat cushion so as to control the rotation of the seat cushion about the second rotational shaft, wherein the rotating member is arranged and constructed to be capable of rotating the rear end portion of the seat cushion downwardly about the second rotational shaft until the detent device functions when the rotating member rotates in the folding direction, so that the rear end portion of the seat cushion moves along the rotational trajectory that does not interfere with the seat back, the rotational trajectory being different from a hypothetical rotational trajectory of the rear end portion expected in case that the rear end portion is not rotated downwardly, and wherein the seat cushion is positioned such that the hypothetical rotational trajectory will interfere with the seat back.

2. The double folding mechanism as defined in claim 1, wherein the biasing force control device comprises a damper.

3. The double folding mechanism as defined in claim 2, wherein the damper comprises a rotary type viscous damper that is coupled to a rotational shaft of the second rotational mechanism.

4. The double folding mechanism as defined in claim 1, wherein the first connecting mechanism comprises a damper that can control a rotational speed of the seat cushion.

5. The double folding mechanism as defined in claim 4, wherein the damper can function after the seat cushion comes out of the rotational trajectory of the upper end portion of the seat back.

6. The double folding mechanism as defined in claim 5, wherein the damper comprises a rotary type viscous damper that is coupled to a rotational shaft of the first rotational mechanism.

7. The double folding mechanism as defined in claim 1, wherein the first connecting mechanism comprises a second biasing device that biases the seat cushion downwardly.

8. The double folding mechanism as defined in claim 7, wherein the second biasing device has a biasing force greater than the first biasing device.

9. The double folding mechanism as defined in claim 1, wherein the first rotational mechanism comprises a rotating member that is rotatably connected to the floor via a first rotational shaft and is rotatably connected to the seat cushion via a second rotational shaft, wherein the first retaining mechanism comprises a locking mechanism that is positioned between the floor and the rotating member, and wherein the locking mechanism is arranged and constructed to function when the rotating member is rotated in the unfolding direction of the seat cushion until the seat cushion reaches the use position, thereby locking the rotating member so that the rotating member cannot rotate relative to the floor.

10. The double folding mechanism as defined in claim 9, wherein the locking mechanism comprises a striker and an engagement member.

11. The double folding mechanism as defined in claim 10, wherein the striker is arranged and constructed to not project laterally from the rotating member.

12. The double folding mechanism as defined in claim 10, wherein the striker comprises a rotated U-shaped member having a pair of leg portions and is arranged so that the leg portions are respectively positioned along a rotation direction of the rotating member.

* * * * *